(12) United States Patent
Saito et al.

(10) Patent No.: US 7,600,386 B2
(45) Date of Patent: Oct. 13, 2009

(54) PULSE TUBE CRYOGENIC COOLER

(75) Inventors: Motokazu Saito, Tokyo (JP); Hisae Yamanouchi, Tokyo (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 447 days.

(21) Appl. No.: 11/526,810

(22) Filed: Sep. 26, 2006

(65) Prior Publication Data
US 2007/0119191 A1 May 31, 2007

(51) Int. Cl.
*F25B 9/00* (2006.01)
(52) U.S. Cl. .............................................. 62/6
(58) Field of Classification Search .................... 62/6
See application file for complete search history.

(56) References Cited

U.S. PATENT DOCUMENTS

| | | | | |
|---|---|---|---|---|
| 4,901,787 A | * | 2/1990 | Zornes | 165/4 |
| 6,082,117 A | * | 7/2000 | Funatsu et al. | 62/6 |
| 6,131,644 A | * | 10/2000 | Kohara et al. | 165/10 |
| 6,715,300 B2 | * | 4/2004 | Longsworth | 62/6 |
| 2003/0163996 A1 | * | 9/2003 | Ravex | 62/6 |
| 2006/0225434 A1 | * | 10/2006 | Arman et al. | 62/6 |
| 2006/0225435 A1 | * | 10/2006 | Arman et al. | 62/6 |

FOREIGN PATENT DOCUMENTS

| | | |
|---|---|---|
| JP | 2002-349981 A | 12/2002 |
| JP | 2003-148826 A | 5/2003 |
| JP | 2003-166766 A | 6/2003 |
| JP | 2004-116816 A | 4/2004 |
| JP | 2005-030704 A | 2/2005 |

OTHER PUBLICATIONS

JPO Office Action, App. No. 2005-102742, Jun. 23, 2009 (2 pages).

* cited by examiner

*Primary Examiner*—William C Doerrler
(74) *Attorney, Agent, or Firm*—Rader, Fishman & Grauer, PLLC

(57) ABSTRACT

A pulse tube cryogenic cooler, includes: a pressure vibration generating device configured to generate pressure vibration in operation gas; a regenerator connected to the pressure vibration generating device; a pulse tube connected to the regenerator; a phase control mechanism connected to the pulse tube; and a heat exchanger provided at an end of the pulse tube; wherein the heat exchanger includes a first laminating part where porous plates having piercing holes and spacers are mutually laminated; and a second laminating part where lower part mesh members are laminated.

13 Claims, 6 Drawing Sheets

PULSE TUBE CRYOGENIC COOLER

BACKGROUND OF THE INVENTION

1. Field of the Invention

The present invention generally relates to pulse tube cryogenic coolers. More particularly, the present invention relates to a pulse tube cryogenic cooler wherein a heat exchanger is provided at an end part of a pulse tube.

2. Description of the Related Art

Generally, a pulse tube cryogenic cooler consisted of a pressure vibration generating device, a regenerator, a pulse tube, a phase control mechanism, and others. Such a pulse tube cryogenic cooler is quieter than a Gifford McMahon (GM) cryogenic cooler or a Stirling type cryogenic cooler. Therefore, application of the pulse tube cryogenic cooler as a cooling device of various test or analyzing devices such as an electron microscope or a Nuclear Magnetic Resonance (NMR) apparatus has been expected.

FIG. 1 is a structural view of a related art double inlet type pulse tube cryogenic cooler.

Referring to FIG. 1, a helium compressor 1, a high pressure valve 3a and a low pressure valve 3b form a pressure vibration generating device. The high pressure valve 3a is provided at an output side of high pressure gas of the helium compressor 1. The low pressure valve 3b is provided at a gas receiving side of the helium compressor 1. This pressure vibration generating device is connected to a high temperature part 2a of a regenerator 2.

The high pressure valve 3a and the low pressure valve 3b are switched at a designated cycle. Therefore, helium gas having a high pressure and generated by the helium compressor 1 is supplied to the regenerator 2 at the designated cycle.

A housing 32 made of stainless steel is provided at upper ends of the regenerator 2 and the pulse tube 6.

In addition, lower ends of the regenerator 2 and the pulse tube 6 are connected to each other by a connection path 4. More specifically, a heat exchanger 5b is provided at the lower end of the pulse tube 6. This heat exchanger 5b and a low temperature part 2b of the regenerator 2 are connected by the connection path 4.

Furthermore, a buffer tank 8 is connected to a high temperature end, namely an upper end, of the pulse tube 6 via a heat exchanger 5a and an orifice 7a.

In addition, a bypass path 9 is provided between a pipe connecting the pressure vibration generating device and the regenerator 2 and a pipe connecting the pulse tube 6 and the buffer tank 8. An orifice 7b is provided in this bypass path 9.

The regenerator 2 is filled with a cold storage material such as wire gauze made of copper or stainless. A punching plate made of aluminum or the like or a copper mesh 10 is laminated inside the heat exchangers 5a and 5b as a heat exchanging member. A numerical reference 11 denotes a rectifier.

In the above-discussed pulse tube cryogenic cooler, when the high pressure valve 3a is opened and the low pressure valve 3b is closed so that an operation mode is started, helium gas compressed by the compressor 1 and having high pressure flows into the regenerator 2.

The helium gas flowing into the regenerator 2 is cooled by the cold storage material provided in the regenerator 2 so that the temperature of the helium gas is decreased. The helium gas flows from the low temperature part 2b of the regenerator 2 to the heat exchanger 5b via the connection path 4 so as to be further cooled and flows into the low temperature side of the pulse tube 6.

Gas having low pressure and already existing in the pulse tube 6 is compressed by the operation gas newly flowing in. Therefore, pressure in the pulse tube 6 becomes higher than pressure in the buffer tank 8. Because of this, the operation gas in the pulse tube 6 flows into the buffer tank 8 via the orifice 7a.

When the high pressure valve 3a is closed and the low pressure valve 3b is opened, the operation gas in the pulse tube 6 flows into the low temperature part 2b of the regenerator 2. The operation gas passes an inside of the regenerator 2 and flows from the high temperature part 2a to the compressor 1 via the low pressure valve 3b.

As discussed above, the high temperature end of the pulse tube 3 and the high temperature part 2a of the regenerator 2 are connected by the bypass path 9 having the orifice 7b. Because of this, the phase of pressure change and the phase of volume change of the operation gas occur with a constant phase difference.

Due to the phase difference, a cold state is generated as the operation gas is expanded at the low temperature end of the pulse tube 6. By repeating the above-discussed steps, the pulse tube cryogenic cooler works as a cryogenic cooler. In the above-discussed double orifice type pulse tube cryogenic cooler, the phase difference can be adjusted by adjusting the orifice 7b provided in the bypass path 9.

In addition, the heat exchanger 5a is provided at the upper end of the pulse tube 6 and the heat exchanger 5b is provided at the lower end of the pulse tube 6 in order to improve cooling efficiency and increase the heat transfer property.

More specifically, as shown in FIG. 2 in an enlarged manner, the mesh 10 made of aluminum or copper is laminated in the heat exchanger 5a provided at the upper end of the pulse tube 6 and positioned in the housing 32. Here, FIG. 2 is a cross-sectional view showing the heat exchanger provided in the related art pulse tube cryogenic cooler.

On the other hand, a structure shown in FIG. 3 and discussed in Japanese Laid-Open Patent Application Publication No. 2003-148826 is known as a heat exchanger having another structure. In the structure disclosed in Japanese Laid-Open Patent Application Publication No. 2003-148826, a laminated wire mesh and a porous plate are combined or a first porous plate, a first laminated wire mesh, a second porous plate and a second laminated wire mesh are provided in a parallel manner.

Here, in the related art pulse tube cryogenic cooler shown in FIG. 1 and FIG. 2, heat conductivity of the heat exchanger 5a between the pulse tube 6 and the housing 32 is discussed.

In the heat exchanger of the related art pulse tube cryogenic cooler, the punching plates or mesh members having the same roughness of meshes are laminated or plural porous plates and the laminated wire mesh having the same roughness of meshes are laminated. Therefore, when helium gas follows from the housing 32 to the pulse tube 6, heat exchanging between the flowing helium gas and the housing 32 cannot be made well. Because of this, helium gas having high temperature flows in the pulse tube 6 so that the cooling efficiency of the pulse tube 6 is decreased due to heat entry.

In addition, when helium gas flows from the pulse tube 6 to the housing 32, it is necessary to transfer heat to the helium gas from the housing 32 from the view point of keeping characteristics of the orifice 7a and the buffer tank 8. However, this heat exchanging cannot be made well due to the same reason as discussed above.

SUMMARY OF THE INVENTION

Accordingly, embodiments of the present invention may provide a novel and useful pulse tube cryogenic cooler, in which one or more of the problems described above are eliminated.

More specifically, the embodiments of the present invention may provide a pulse tube cryogenic cooler wherein a heat exchanging property of a heat exchanger is improved.

The embodiments of the present invention may also provide a pulse tube cryogenic cooler, including:

a pressure vibration generating device configured to generate pressure vibration in operation gas;

a regenerator connected to the pressure vibration generating device;

a pulse tube connected to the regenerator;

a phase control mechanism connected to the pulse tube; and a heat exchanger provided at an end of the pulse tube;

wherein the heat exchanger includes a first laminating part where porous plates having piercing holes and spacers are mutually laminated; and a second laminating part where lower part mesh members are laminated.

According to the above-mentioned pulse tube cryogenic cooler of the embodiments of the present invention, it is possible to improve the heat exchanging property of a heat exchanger and therefore a cooling property of the pulse tube cryogenic cooler can be improved.

Other objects, features, and advantages of the present invention will become more apparent from the following detailed description when read in conjunction with the accompanying drawings.

DETAILED DESCRIPTION OF THE PREFERRED EMBODIMENT

A description will now be given, with reference to FIG. 3 through FIG. 6, of embodiments of the present invention.

Figure 1:
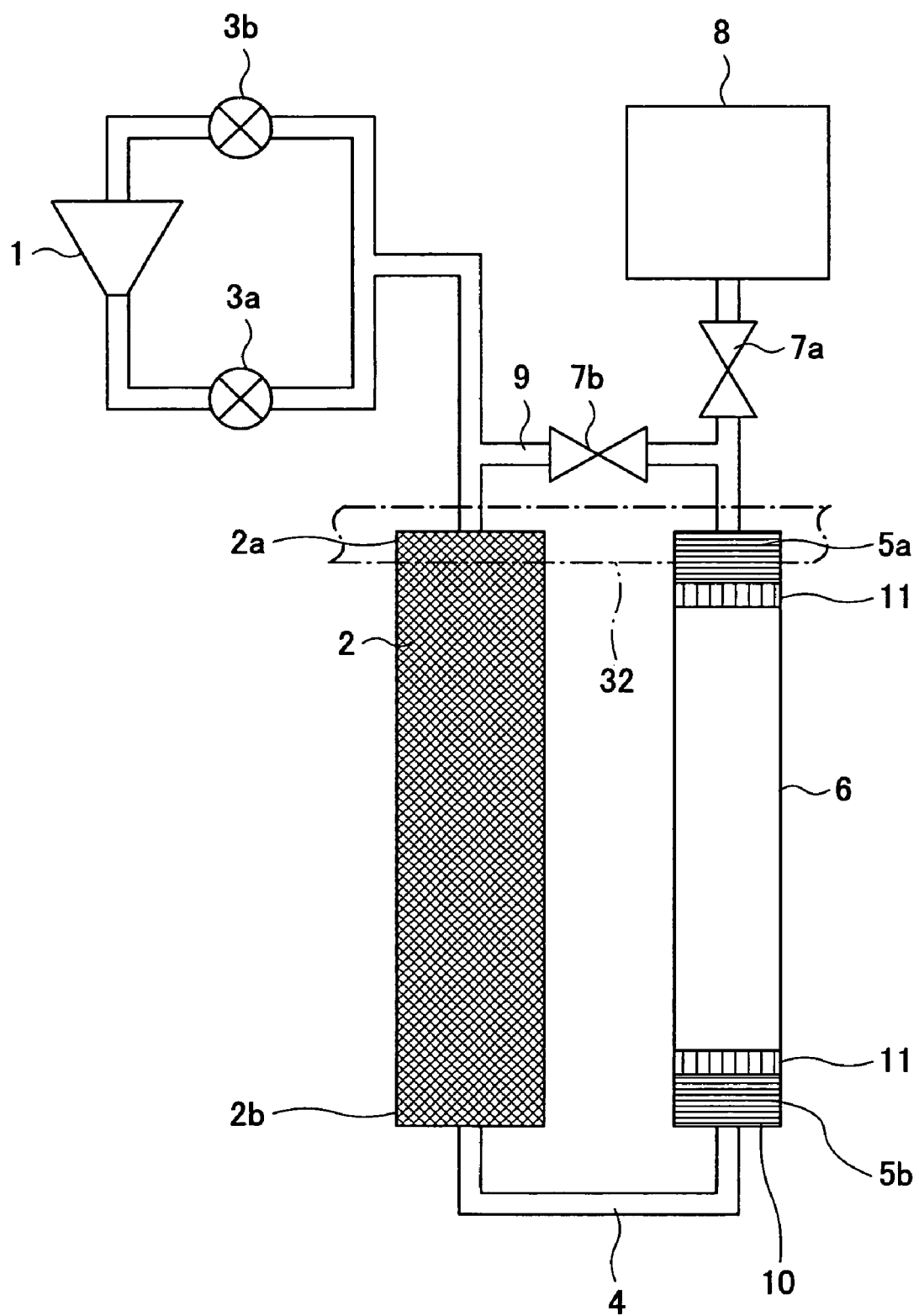
FIG. 1 is a structural view of a related art pulse tube cryogenic cooler.
Figure 2:
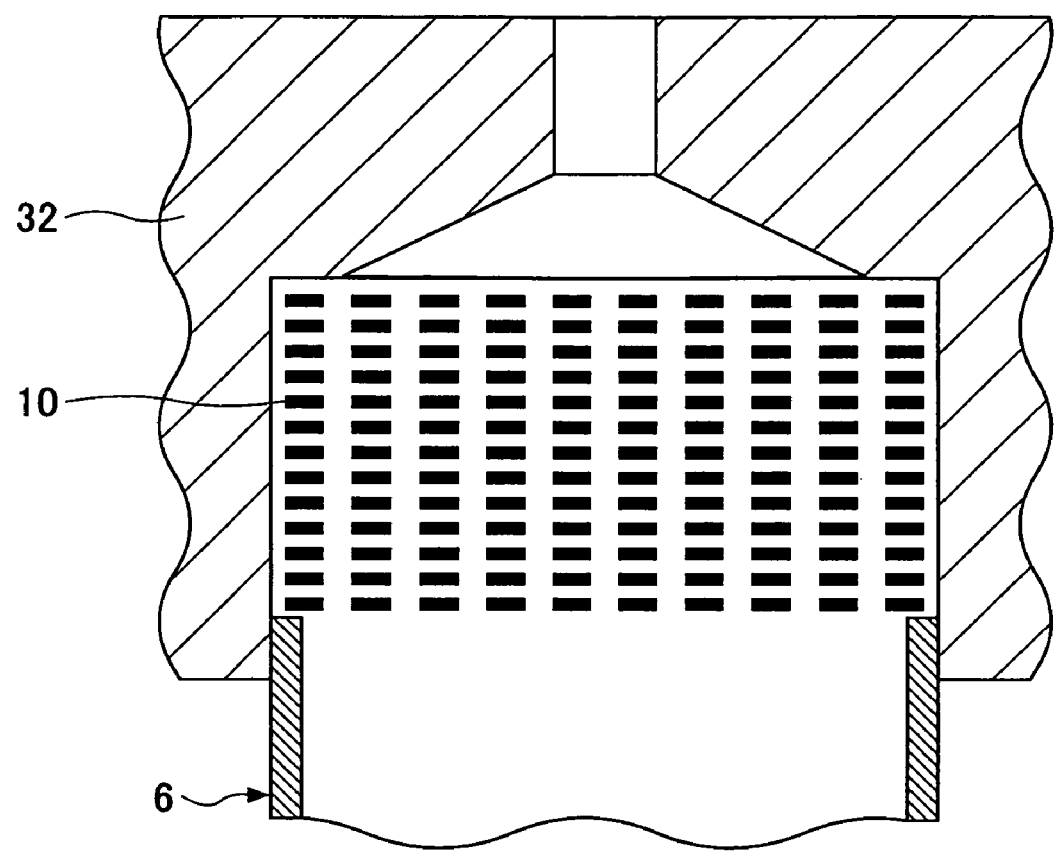
FIG. 2 is a cross-sectional view showing, in an enlarged manner, a heat exchanger provided in the related art pulse tube cryogenic cooler.
Figure 3:
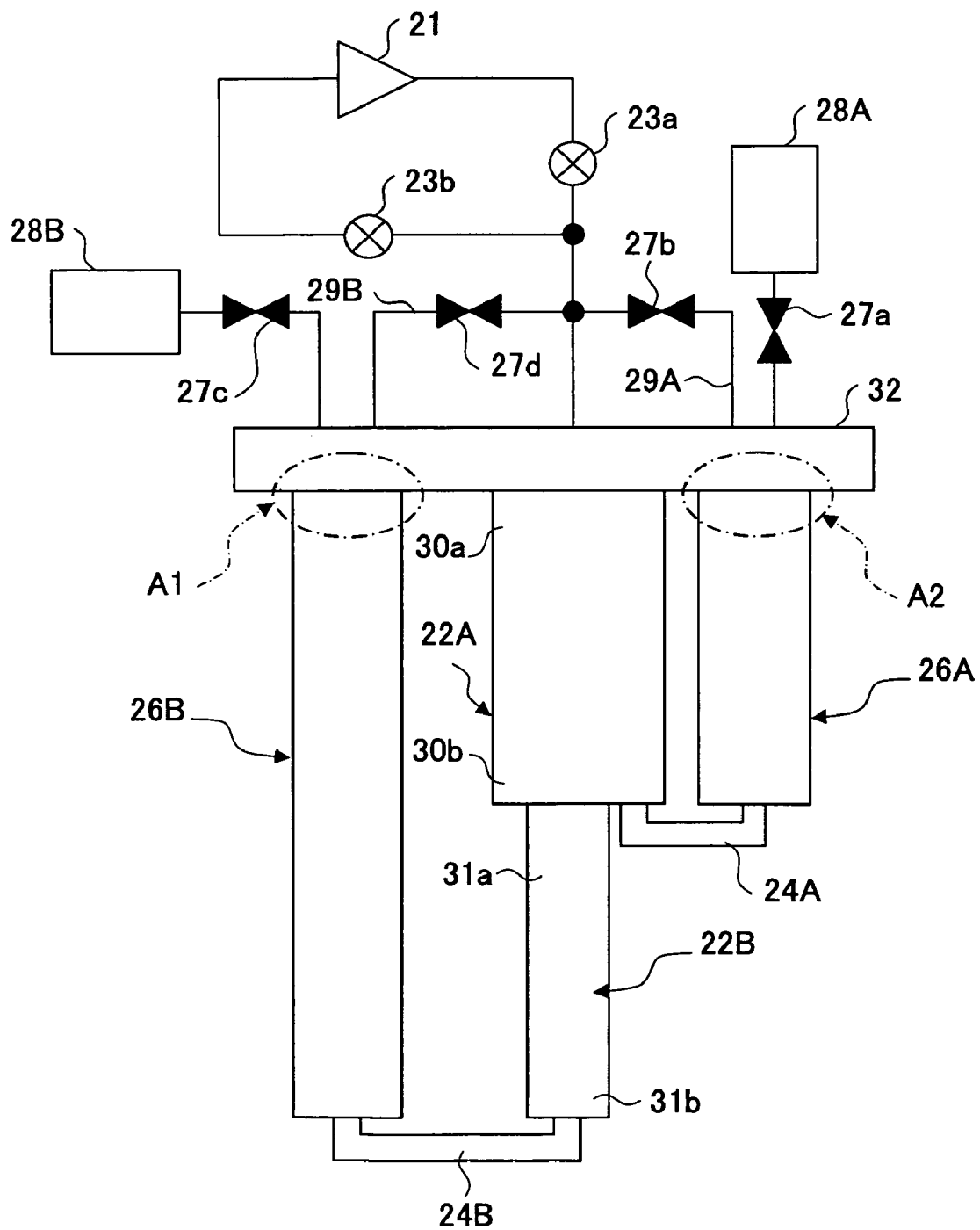
FIG. 3 is a structural view of a two-stage double inlet type pulse tube cryogenic cooler of an embodiment of the present invention.
Figure 4:
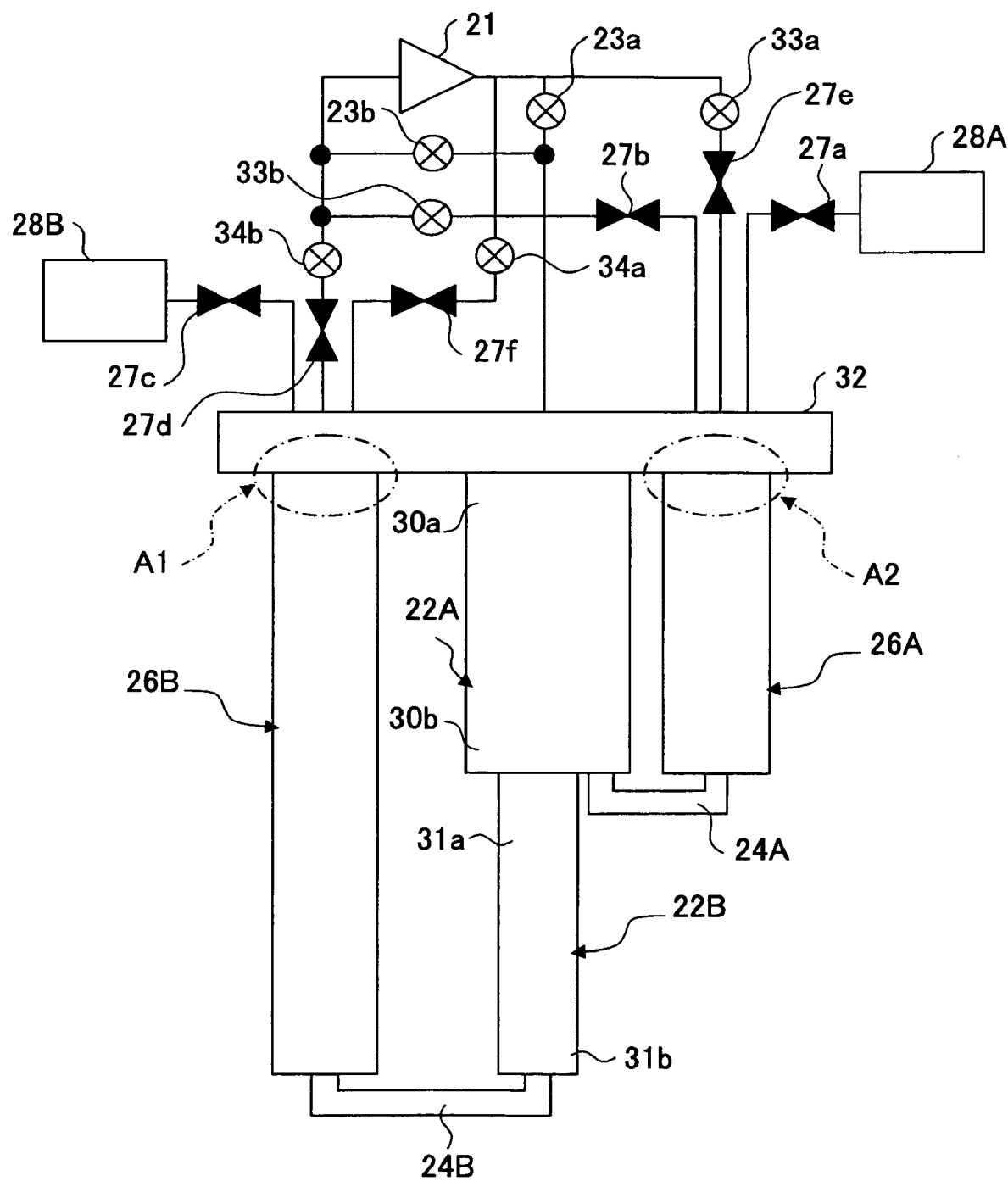
FIG. 4 is a structural view of a two-stage four-valve type pulse tube cryogenic cooler of an embodiment of the present invention.

FIG. 3 and FIG. 4 show pulse tube cryogenic coolers 20A and 20B of an embodiment of the present invention. More specifically, FIG. 3 is a structural view of a two-stage double inlet type pulse tube cryogenic cooler 20A of an embodiment of the present invention. FIG. 4 is a structural view of a two-stage four-valve type pulse tube cryogenic cooler 20B of an embodiment of the present invention.

First, the two-stage double inlet type pulse tube cryogenic cooler 20A of the embodiment of the present invention is discussed with reference to FIG. 3.

The pulse tube cryogenic cooler 20A is a two-stage type and therefore has a first step regenerator 22A and a second step regenerator 22B as regenerators. In addition, the pulse tube cryogenic cooler 20A has a first step pulse tube 26A and a second step pulse tube 26B as pulse tubes.

A high temperature part 30a of the first step regenerator 22A, an upper end of the first step pulse tube 26A, and an upper end of the second step pulse tube 26B are supported by a flange 32.

Figure 5:
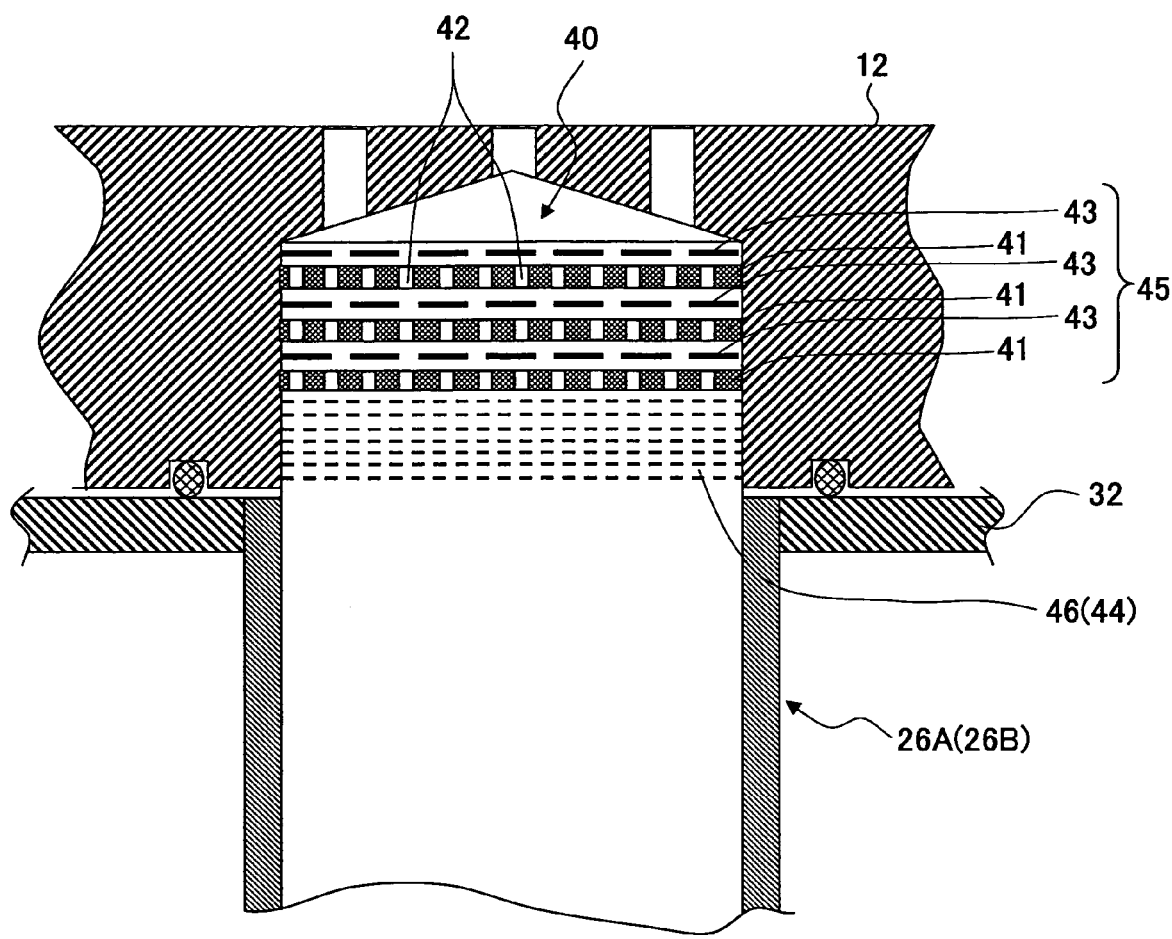
FIG. 5 is a cross-sectional view showing a vicinity of a heat exchanger as a main part of the embodiment of the present invention.

In addition, a housing 12 shown in FIG. 5 is provided on the flange 32. This housing 12 is made of aluminum having a coefficient of thermal conductivity higher than that of stainless steel conventionally used for the housing.

The first step regenerator 22A and the second step regenerator 22B are directly connected to each other. In other words, a low temperature part 30b of the first step regenerator 22A is connected to a high temperature part 31a of the second step regenerator 22B.

In addition, the low temperature part 30b of the first step regenerator 22A and the lower end of the first step pulse tube 26A are connected by a connection path 24A. Furthermore, a low temperature part 31b of the second step regenerator 22B and the lower end of the second step pulse tube 26B are connected by a second connection path 24B.

Furthermore, heat exchangers (not shown in FIG. 3 and FIG. 4) are provided in high temperature end (upper end) and low temperature ends (lower end) of the first step pulse tube 26A and the second step pulse tube 26B.

In addition, a helium compressor 21, a high pressure valve 23a and a low pressure valve 23b form a pressure vibration generating device. The high pressure valve 23a is provided at an output side of high pressure gas of the helium compressor 21. The low pressure valve 23b is provided at a gas receiving side of the helium compressor 21.

This pressure vibration generating device is connected to the high temperature part 30a of the first step regenerator 22A. The high pressure valve 23a and the low pressure valve 23b are switched at a designated cycle.

Therefore, operation gas, helium gas in this embodiment, having a high pressure and generated by the helium compressor 21 is supplied to the first step regenerator 22A at the designated cycle.

A high temperature end (upper end) of the first step pulse tube 26A and a first buffer tank 28A are connected by a pipe 35b. An orifice 27a is provided at the pipe 35b.

In addition, a first bypass path 29A is provided between a pipe 35a and the high temperature end of the first pulse tube 26A. The pipe 35a connects the pressure vibration generating device and the first step regenerator 22A. An orifice 27b is provided at the first bypass path 29A.

On the other hand, a high temperature end (upper end) of the second step pulse tube 26B and a second buffer tank 28B are connected by a pipe 35c. An orifice 27c is provided at the pipe 35c.

In addition, a second bypass path 29B is provided between the pipe 35a and the high temperature end of the second pulse tube 26B. An orifice 27d is provided at the second bypass path 29B.

In the above-discussed pulse tube cryogenic cooler 20A, when the high pressure valve 23a is opened and the low pressure valve 23b is closed so that an operation mode is started, helium gas compressed by the compressor 21 and having high pressure flows into the first step regenerator 22A via the pipe 35a.

The helium gas flowing into the first step regenerator 22A is cooled by the cold storage material provided in the first step regenerator 22A so that the temperature of the helium gas is decreased. A part of the helium gas flows from the low temperature part 30b of the first step regenerator 22A to the lower temperature end (lower end) of the first step pulse tube 26A via the connection path 24A.

Helium gas having a low pressure and already existing in the first step pulse tube 26A is compressed by the operation gas newly flowing in. Therefore, the pressure in the first step pulse tube 26A becomes higher than the pressure in the first buffer tank 28A.

Because of this, the helium gas in the first step pulse tube 26A flows into the first buffer tank 28A via the orifice 27a.

When the high pressure valve 23a is closed and the low pressure valve 23b is opened, the helium gas in the first step pulse tube 26A flows in the low temperature part of the first step regenerator 22A. The helium gas passes inside of the first step regenerator 22A and flows from the high temperature part 30a to the compressor 21 via the low pressure valve 23b.

As discussed above, the high temperature end of the first step pulse tube 26A and the pipe 35a are connected by the first bypass path 29A having the orifice 27b.

Because of this, the phase of pressure change and the phase of volume change of the operation gas occur with a constant phase difference. Due to the phase difference, a cold state is generated as the helium gas is expanded at the low temperature end (lower end) of the first step pulse tube 26A.

In the operation mode started by opening the high pressure valve 23a and closing the low pressure valve 23b, helium gas not flowing into the first step pulse tube 26A in the helium gas flowing from the helium compressor 21 to the first step regenerator 22A via the pipe 35a flows from the first step regenerator 22A to the second step regenerator 22B.

At this time, as discussed above, the helium gas cooled by the first step pulse tube 26A flows back into the low temperature part 30b of the first step regenerator 22A. Therefore, the low temperature part 30b is cooled.

Accordingly, the helium gas flowing from the first step regenerator 22A to the second step regenerator 22B is cooled by the first step pulse tube 26A and then flows to the high temperature part 31a of the second step regenerator 22B.

The helium gas flowing into the second step regenerator 22B is cooled by the cold storage material provided in the second step regenerator 22B so that temperature of the helium gas is further decreased and the helium gas arrives at the low temperature part 31b. Then, the helium gas passes the second connection path 24B and flows into the lower temperature end (lower end) of the second step pulse tube 26B.

Helium gas having a low pressure and already existing in the second step pulse tube 26B is compressed by the helium gas newly flowing in. Therefore, the pressure in the second step pulse tube 26B becomes higher than the pressure in the second buffer tank 28B.

Because of this, the helium gas in the second step pulse tube 26B flows into the second buffer tank 28B via the orifice 27c.

When the high pressure valve 23a is closed and the low pressure valve 23b is opened, the helium gas in the second step pulse tube 26B flows back into the low temperature part 31b of the second step regenerator 22B. The helium gas flowing into the low temperature part 31b of the second step regenerator 22B further passes inside of the first step regenerator 22A and flows from the high temperature part 30a to the compressor 21 via the low pressure valve 23b.

In addition, as discussed above, the high temperature end of the second step pulse tube 26B and the pipe 35a are connected by the second bypass path 29B having the orifice 27d.

Because of this, even in the second step pulse tube 26B, the phase of pressure change and the phase of volume change of the helium gas (the operation gas) occur with a constant phase difference. Due to the phase difference, a cold state as the helium gas is expanded at the low temperature end (lower end) of the second step pulse tube 26B is generated.

In the above-discussed two-stage double inlet type pulse tube cryogenic cooler 20A shown in FIG. 3, the first buffer tank 28A, the second buffer tank 28B, and the orifices 27a through 27d form a phase control-mechanism. By adjusting the orifices 27b and 27d provided at the first bypass paths 29A and 29B, respectively, it is possible to adjust the phase difference. As a result of this, it is possible to perform highly efficient cooling.

In addition, the helium gas cooled by the first step regenerator 22A and the first step pulse tube 26A is further cooled by the second regenerator 22B and the second step pulse tube 26B. Therefore, the temperature at the cooling side of the second step pulse tube 26B can be a cryogenic temperature, for example at 4 K (Kelvin).

Next, a two-stage four-valve type pulse tube cryogenic cooler 20B is discussed with reference to FIG. 4. In FIG. 4, parts that are the same as the parts of the two-stages double inlet type pulse tube cryogenic cooler 20A shown in FIG. 3 are given the same reference numerals, and explanation thereof is omitted.

Referring to FIG. 4, in the two-stage four-valve type pulse tube cryogenic cooler 20B, two pipes 35d and 35e are connected to a high temperature end of a first step pulse tube 26A. Two pipes 35f and 35g are connected to a high temperature end of a second step pulse tube 26B.

The pipe 35d connected to the first step pulse tube 26A is connected to a supplying side (a high pressure side) of a helium compressor 21 via an orifice 27e and a high pressure valve 33a. In addition, the pipe 35g connected to the second step pulse tube 26B is connected to the supplying side (the high pressure side) of the helium compressor 21 via an orifice 27f and a high pressure valve 34a.

Furthermore, the pipe 35e connected to the high temperature end of the first step pulse tube 26A is connected to the gas receiving side (the low pressure side) of the helium compressor 21 via the orifice 27b and the low pressure valve 33b. In addition, the pipe 35f connected to the high temperature end of the second step pulse tube 26B is connected to a gas receiving side (the low pressure side) of the helium compressor 21 via the orifice 27d and the low pressure valve 34b.

Thus, in the two-stage four-valve type pulse tube cryogenic cooler 20B, the pipes 35d and 35g connected to the high pressure side of the helium compressor 21 and the pipes 35e and 35f connected to the low pressure side of the helium compressor 21 are connected to the high temperature ends of the pulse tubes 26A and 26B, respectively.

In addition, the orifices 27b, 27d, 27e, and 27f, the high pressure valves 33a and 34a, and the low pressure valves 33b and 34b are provided at the pipes 35d through 35g. Therefore, flow of the helium gas in the pipes 35d through 35g can be controlled.

In the two-stage four-valve type pulse tube cryogenic cooler 20B shown in FIG. 4, the first buffer tank 28A, the second buffer tank 28B, the orifices 27a through 27f, and the valves 33a, 33b, 34a and 34b form a phase control mechanism.

By adjusting the orifices 27b, 27d, 27e, and 27f and the valves 33a, 33b, 34a, and 34b, it is possible to adjust the phase of pressure change and the phase of volume change of the helium gas (the operation gas) between the first step regenerator 22A and the first step pulse tube 26A, and the phase of pressure change and the phase of volume change of the helium gas between the second step regenerator 22B and the second step pulse tube 26B, with a constant phase difference. As a result of this, it is possible to perform highly efficient cooling by the pulse tubes 26A and 26B.

Next, a heat exchanger 40 of an embodiment of the present invention is discussed. The heat exchangers 40 are provided at the high temperature ends of the first step pulse tube 26A and the second step pulse tube 26B, namely portions indicated by arrows A1 and A2 in FIG. 3 and FIG. 4.

Figure 6:
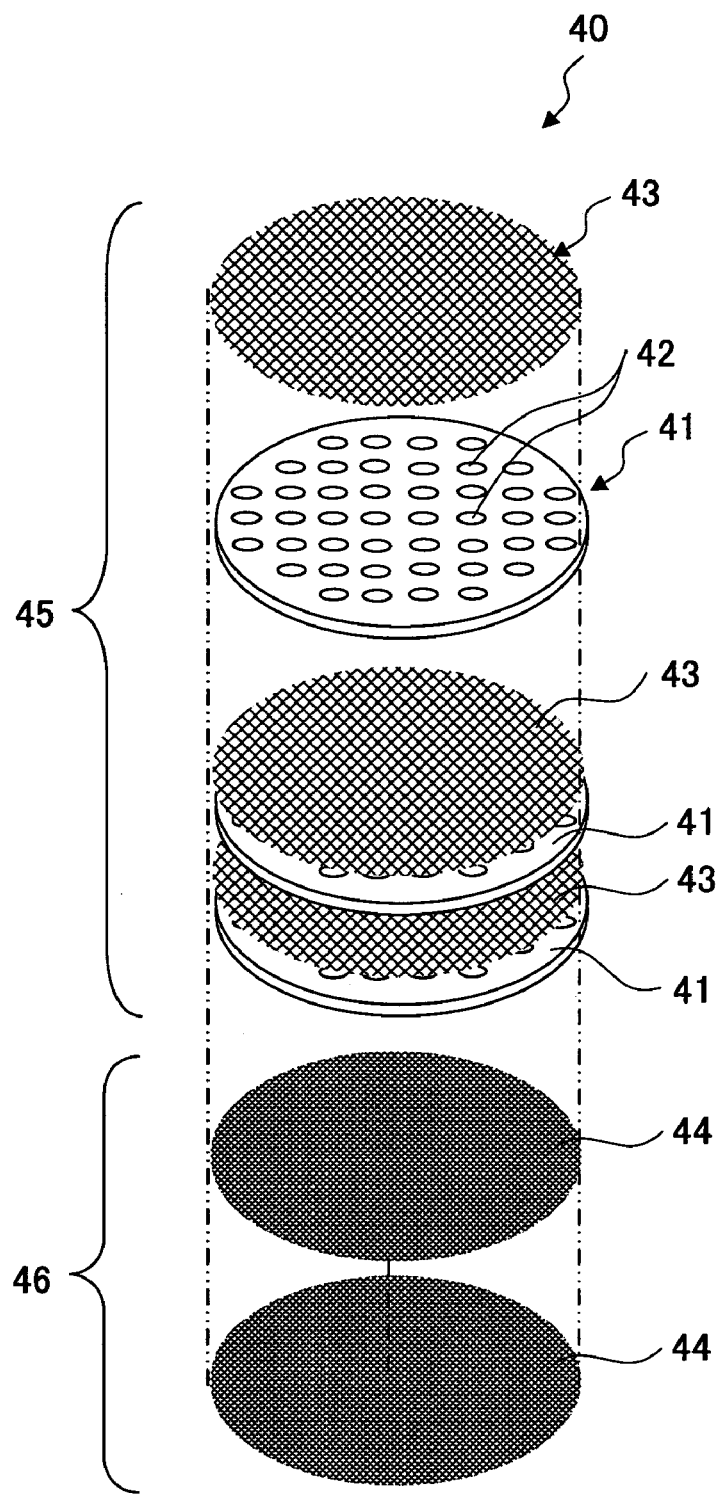
FIG. 6 is an exploded perspective view showing a part of the heat exchanger of the embodiment of the present invention.

FIG. 5 is a cross-sectional view showing a heat exchanger 40 and its vicinity. FIG. 6 is an exploded perspective view showing a part of the heat exchanger 40.

Referring to FIG. 5 and FIG. 6, the heat exchanger 40 includes a first laminating part 45 and a second laminating part 46. The heat exchanger 40 is provided in the housing 12. More specifically, in the housing 12, the heat exchanger 40 is provided at an upper part of a part where the pulse tube 26A (26B) is supported by the flange 32. In addition, the first laminating part 45 is arranged at a side of the housing 12 and the second laminating part is arranged at a side of the pulse tube 26A (26B).

The first laminating part 45 is formed by porous plates 41 and spacers. In this embodiment, mesh members 43 (hereinafter "first mesh member 43") are used as the spacers. The porous plate 41 is made of a material (copper in this embodiment) having a high coefficient of thermal conductivity. A large number of small holes 42 are formed in the porous plate 41.

By passing through the small holes 42, helium gas is rectified so that flow rate distribution in the pulse tube 26A (26B) can be made uniform. In a case where the diameter of the porous plate 41 is 52 mm, the diameter of the small hole 42 is approximately 0.5 mm and the pitch of neighboring small holes 42 is approximately 0.95 mm.

The first mesh member 43 has a structure where wires made of a material (copper in this embodiment, the same as for the porous plate 41) having a high coefficient of thermal conductivity, are provided in a mesh structure. While this first mesh member 43 uses a wire mesh having a relative roughness such as roughness #16, a wire mesh having roughness in a range of #10 through #80 can be used for the first mesh member 43.

The above-discussed porous plates 41 and the first mesh members 43 are mutually laminated so that the first laminating part 45 is formed. Although gaps between the porous plates 41 and the first mesh members 43 are illustrated in FIG. 6 for convenience of explanation, the porous plates 41 and the first mesh member 43 are actually laminated so as to adhere to each other as shown in FIG. 5.

Because of this, the space between a neighboring pair of porous plates 41 is defined by the thickness of the first mesh member 43. In other words, as discussed above, the first mesh member 43 functions as a spacer of laminated porous plates 41.

Although the first mesh member 43 is provided as a spacer for making a gap having a designated length between the neighboring porous plates 41 in this embodiment, this spacer is not limited to being a mesh member. For example, a ring shape member can be used as this spacer. More specifically, a ring shape member made of copper or aluminum, having thickness of approximately 0.1 mm through 1.0 mm and width of a ring part of approximately 2 mm, can be used.

On the other hand, the second laminating part 46 provided at the side of the pulse tube 26A (26B) is formed by laminating plural (10 pieces in this embodiment) lower part mesh members 44.

In this embodiment, as this lower part mesh member (hereinafter "second mesh member 44"), a wire mesh having narrow meshes such as roughness #250 is used, meaning that the mesh is smaller than that of the above-mentioned first mesh member 43. However, the roughness of the mesh of the second mesh member 44 is not limited to this example. For example, a wire mesh having roughness in a range of #80 through #400 can be used for the second mesh member 44.

Thus, in the heat exchanger 40, the porous plates 41 and the first mesh members 43 are mutually laminated so that the first laminating part 45 is formed. The first mesh member 43 function as spacers for holding the space between neighboring porous plates 41 at a constant gap and rectify, together with the small holes 42 formed in the porous plates 41, helium gas passing through the first laminating part 45.

As a result of this, since the neighboring porous plates 41 are arranged at a uniform spacing and at high density by the first mesh member 43, when helium gas passes through the first laminating part 45, it is possible to perform heat exchange between helium gas and the first laminating part 45 formed by the porous plates 41 and the first mesh members 43.

In addition, since helium gas is rectified in the first laminating member 45, it is possible to prevent generation of heat inclination in the first laminating part 45 so that the heat exchange property can be improved.

Furthermore, in the second laminating member 46, plural second mesh members 44 having narrow meshes are laminated. Therefore, it is possible to make an area where helium gas in contact wide. Because of this, in the second mesh member 44 as compared to the first mesh member 43, heat exchanging effectiveness can be improved.

More specifically, while the surface area of one piece of the first mesh member 43 using the mesh having the roughness #16 is approximately 5.6 cm$^2$, the surface area of one piece of the second mesh member 44 using the mesh having the roughness #250 is approximately 38.0 cm$^2$.

Thus, since there is a difference between the surface areas of the first mesh member 43 and the second mesh member 44, the heat exchanging characteristic of the second mesh member 44 is better than the heat exchanging characteristic of the first mesh member 43.

Especially, when helium gas flows from the housing 12 to the pulse tube 26A (26B), since helium gas is rectified by the first laminating part 45, it is possible to make heat-exchange with the second mesh member 44 more efficiently.

Thus, in this embodiment, by providing the first laminating part 45 and the second laminating part 46 in the heat exchanger 40, it is possible to improve heat exchanging effectiveness with helium gas so that cooling properties of the pulse tube cryogenic cooler 20A (20B) can be improved.

In addition, it is crucial that, as discussed above, the first laminating part 45 be arranged at the side of the housing 12 and the second laminating part be arranged at the side of the pulse tube 26A (26B).

Inventors of the present invention made a heat exchanger for comparison having a structure where the first laminating part 45 is arranged at the side of the pulse tube 26A (26B) and the second laminating part is arranged at the side of the housing 12. Then, the inventors compared the cooling property of the second step pulse tube 26B in a case where the above-mentioned heat exchanger for comparison is applied and the cooling property of the second step pulse tube 26B in a case where the heat exchanger 40 of this embodiment is applied.

As a result of the comparison, the inventors found that while the cooling property of the second step pulse tube 26B in the case where the heat exchanger for comparison is used is 4.51 K at the time of 1 W load, the cooling property of the second step pulse tube 26B in the case where the heat exchanger 40 of this embodiment is used is 4.15 K at the time of 1 W load and therefore improvement of the cooling property of 0.36 K is obtained.

On the other hand, the heat exchanger 40 is provided in the housing 12 and the housing 12 is made of aluminum having good thermal conductivity. Thus, since the heat exchanger 40 having high thermal exchange efficiency is provided in the housing 12 having good thermal conductivity, it is possible to efficiently exchange heat between helium gas and the housing 12.

Thus, when helium gas flows from the housing 12 to the pulse tube 26A (26B), heat of high temperature helium gas is exchanged by the heat exchanger 40 and the housing 12 so that heat entry into the pulse tube 26A (26B) can be reduced.

In addition, when helium gas flows from the pulse tube 26A (26B) to the housing 12, helium gas cooled by the low temperature end of the pulse tube 26A (26B) is securely heated-up by the heat exchanger 40 and the housing 12. Because of this, it is possible to prevent the pressure vibration generating device (the helium compressor 21 and others) from being damaged by helium gas to be received.

Thus, according to the above-discussed embodiment of the present invention, it is possible to provide a pulse tube cryogenic cooler, including: a pressure vibration generating device configured to generate pressure vibration in operation gas; a regenerator connected to the pressure vibration generating device; a pulse tube connected to the regenerator; a phase control mechanism connected to the pulse tube; and a heat exchanger provided at an end of the pulse tube; wherein the heat exchanger includes a first laminating part where porous plates having piercing holes and spacers are mutually laminated; and a second laminating part where lower part mesh members are laminated.

In the above-mentioned pulse tube cryogenic cooler, in the first laminating part, the porous plates having the piercing holes and the spacers are mutually laminated. Therefore, the spacers are provided between neighboring porous plates so that neighboring porous plates are arranged at high density with a constant spacing. Hence, it is possible to improve heat exchange effectiveness.

In addition, in the second laminating part, the lower part mesh members having narrow meshes are laminated. Accordingly, an area contacting the operation gas is wide and the operation gas passing through the first laminating part is rectified so that the heat exchange efficiency between the operation gas and the lower part mesh member is improved.

Accordingly, by providing the above-mentioned first laminating part and the second laminating part, it is possible to improve heat exchange efficiency with the operation gas and therefore a cooling property of the pulse tube cryogenic cooler can be improved.

In the above-mentioned pulse tube cryogenic cooler, the heat exchanger may be provided in a housing provided at an upper part of a flange supporting the pulse tube.

According to the above-mentioned pulse tube cryogenic cooler, it is possible to exchange heat between the operation gas and the housing efficiently.

In the above-mentioned pulse tube cryogenic cooler, the spacer may be a mesh member or a ring shape member. A wire mesh having roughness of #10 through #80 may be used as the spacer; and another wire mesh having roughness of #80 through #400 may be used as the lower part mesh member. Furthermore, The housing is made of aluminum.

Furthermore, according to the above-discussed embodiment of the present invention, it is possible to provide a superconducting apparatus including the pulse tube cryogenic cooler discussed above, a cryopump including the pulse tube cryogenic cooler discussed above, a cryogenic measuring and analyzing apparatus including the pulse tube cryogenic cooler discussed above, and a nuclear magnetic resonance apparatus including the pulse tube cryogenic cooler discussed above.

The present invention is not limited to these embodiments, but variations and modifications may be made without departing from the scope of the present invention.

What is claimed is:

1. A pulse tube cryogenic cooler, comprising:
   a pressure vibration generating device configured to generate pressure vibration in operation gas;
   a regenerator connected to the pressure vibration generating device;
   a pulse tube connected to the regenerator;
   a phase control mechanism connected to the pulse tube; and
   a heat exchanger provided at an end of the pulse tube;
   wherein the heat exchanger includes
   a first laminating part where porous plates having piercing holes and first mesh members are mutually laminated; and
   a second laminating part where second mesh members are laminated,
   wherein the first mesh members have a first mesh member roughness and the second mesh members have a second mesh member roughness being larger than the first mesh member roughness.

2. The pulse tube cryogenic cooler as claimed in claim 1, wherein the heat exchanger is provided in a housing provided at an upper part of a flange supporting the pulse tube.

3. The pulse tube cryogenic cooler as claimed in claim 1, wherein each first mesh member is a ring shaped member.

4. The pulse tube cryogenic cooler as claimed in claim 2, wherein each first mesh member is a ring shape member.

5. The pulse tube cryogenic cooler as claimed in claim 1, wherein a wire mesh having roughness of #10 through #80 is used as each first mesh member; and
   another wire mesh having roughness of #80 through #400 is used as each second mesh member.

6. The pulse tube cryogenic cooler as claimed in claim 2, wherein a wire mesh having roughness of #10 through #80 is used as each first mesh member; and
   another wire mesh having roughness of #80 through #400 is used as the each second mesh member.

7. The pulse tube cryogenic cooler as claimed in claim 3, wherein a wire mesh having roughness of #10 through #80 is used as each first mesh member; and
   another wire mesh having roughness of #80 through #400 is used as each second mesh member.

8. The pulse tube cryogenic cooler as claimed in claim 4, wherein a wire mesh having roughness of #10 through #80 is used as each first mesh member; and
   another wire mesh having roughness of #80 through #400 is used as each second mesh member.

9. The pulse tube cryogenic cooler as claimed in claim 2, wherein the housing is made of aluminum.

10. A superconducting apparatus, comprising:
the pulse tube cryogenic cooler as set forth in claim 1.

11. A cryopump, comprising:
the pulse tube cryogenic cooler as set forth in claim 1.

12. A cryogenic measuring and analyzing apparatus, comprising:
the pulse tube cryogenic cooler as set forth in claim 1.

13. A nuclear magnetic resonance apparatus comprising:
the pulse tube cryogenic cooler as set forth in claim 1.

* * * * *